(12) United States Patent
Küpper et al.

(10) Patent No.: US 10,369,541 B2
(45) Date of Patent: Aug. 6, 2019

(54) METHOD FOR OPERATING A PRODUCTION PLANT OF MODULAR DESIGN

(71) Applicant: BAYER AKTIENGESELLSCHAFT, Leverkusen (DE)

(72) Inventors: Achim Küpper, Leverkusen (DE); Stefan Ochs, Köln (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 311 days.

(21) Appl. No.: 15/104,328

(22) PCT Filed: Dec. 16, 2014

(86) PCT No.: PCT/EP2014/077953
§ 371 (c)(1),
(2) Date: Jun. 14, 2016

(87) PCT Pub. No.: WO2015/091474
PCT Pub. Date: Jun. 25, 2015

(65) Prior Publication Data
US 2016/0325260 A1    Nov. 10, 2016

(30) Foreign Application Priority Data

Dec. 20, 2013  (DE) .......................... 10 2013 114 720

(51) Int. Cl.
*B01J 19/00* (2006.01)

(52) U.S. Cl.
CPC ......... *B01J 19/004* (2013.01); *B01J 19/0033* (2013.01); *B01J 2219/00162* (2013.01);
(Continued)

(58) Field of Classification Search
CPC .................. B01J 19/0033; B01J 19/004; B01J 2219/00162; B01J 2219/00164;
(Continued)

(56) References Cited

U.S. PATENT DOCUMENTS 4,332,590 A * 6/1982 Smith .................. B01J 19/0006
422/62
5,746,993 A * 5/1998 Mullee .................... C01C 1/022
423/352

(Continued)

*Primary Examiner* — Abdelmoniem I Elamin
(74) *Attorney, Agent, or Firm* — McBee Moore Woodward & Vanik IP, LLC

(57) ABSTRACT

A method operates a production plant, the method having process modules, wherein, for each process module, the amount of material that is respectively present in this process module and is to be processed by this process module is continuously or discretely detected and compared with a prescribed limit value for the amount, wherein
 a mass inflow into the respective process module is increased or decreased if the amount of material that is respectively present in this process module and is to be processed by this process module is less than or greater than the limit value for the amount, or
 a mass outflow from the respective process module is increased or decreased if the amount of material that is respectively present in this process module and is to be processed by this process module is greater than or less than the limit value for the amount.

14 Claims, 2 Drawing Sheets

(52) U.S. Cl.
CPC ............... *B01J 2219/00164* (2013.01); *B01J 2219/00182* (2013.01); *B01J 2219/00686* (2013.01); *Y02P 90/265* (2015.11)

(58) Field of Classification Search
CPC ... B01J 2219/00182; B01J 2219/00686; Y02P 90/265
See application file for complete search history.

(56) References Cited

U.S. PATENT DOCUMENTS

| | | | | |
|---|---|---|---|---|
| 5,806,716 | A | * | 9/1998 | Vogt .................. B67D 7/16 222/59 |
| 6,037,491 | A | * | 3/2000 | Vassiliou ............ B01J 19/0006 562/413 |
| 6,056,635 | A | * | 5/2000 | Vermeer ................ A22C 11/10 452/30 |
| 7,813,839 | B2 | * | 10/2010 | Mahrenholtz ........ B01J 19/0033 560/347 |
| 2003/0183279 | A1 | * | 10/2003 | Chang .................. G05D 7/0647 137/487.5 |
| 2008/0233653 | A1 | * | 9/2008 | Hess ...................... G01N 30/88 436/43 |
| 2010/0012026 | A1 | * | 1/2010 | Hirata ................. C23C 16/4481 118/666 |
| 2011/0172934 | A1 | * | 7/2011 | Frei ........................ G01G 11/08 702/45 |
| 2014/0010734 | A1 | * | 1/2014 | Ludwig ............. B01L 3/502707 422/502 |
| 2014/0096728 | A1 | * | 4/2014 | Ortenheim ................ C25B 9/04 123/3 |

* cited by examiner

METHOD FOR OPERATING A PRODUCTION PLANT OF MODULAR DESIGN

This application is a 371 application of PCT/EP 2014/077953, filed Dec. 16, 2014, which claims foreign priority benefit under 35 U.S.C. § 119 of German Application No. DE 10 2013 114 720.8, filed Dec. 20, 2013.

The work which led to this invention was sponsored by grant agreement no. 228867 as part of the European Union's seventh framework programme RP 7/2007-2013.

The invention relates to a method for operating a production plant for the production of a chemical and/or pharmaceutical product, having process modules which are connected to one another for production purposes and are autonomous for regulating purposes.

The present invention also relates to a production plant for producing a chemical and/or pharmaceutical product.

In order to produce a particular chemical and/or pharmaceutical product, it is necessary to provide a production plant having an individual plant structure in order to be able to carry out the process steps respectively required in terms of process engineering in individual process sections. If there is no longer a desire to produce this particular product, the production plant is usually dismantled again in order to be able to construct another production plant having an individual plant structure, which can be used to produce another chemical and/or pharmaceutical product, at the same location. This construction and dismantling of production plants is very time-consuming and cost-intensive. There is therefore a constant need to reduce the amount of effort associated with the production of different chemical and/or pharmaceutical products.

To avoid this problem, a production plant may be constructed in a modular manner from individual process modules which can be connected to one another for process purposes and are autonomous for regulating purposes. However, such production plants require novel regulating concepts, since regulating concepts that are used in conventional production plants are not readily transferable to production plants that are constructed in a modular manner from process modules which are autonomous for regulating purposes.

The object of the invention is to provide a regulating concept for a production plant for producing a chemical and/or pharmaceutical product having process modules which are connected to one another for production purposes and are autonomous for regulating purposes.

This object is achieved by a method with the features according to Patent Claim 1 and a production plant with the features according to Patent Claim 4. Preferred refinements of the invention are stated in the subclaims which may each constitute an aspect of the invention per se or in any desired combination with one another.

In Patent Claim 1, a method for operating a production plant for the production of a chemical and/or pharmaceutical product having process modules which are connected to one another for production purposes and are autonomous for regulating purposes is proposed, wherein for each process module the amount of material that is respectively present in this process module and is to be processed by this process module is continuously or discretely detected and compared with a prescribed limit value for the amount, wherein a mass inflow into the respective process module is increased or decreased if the amount of material that is respectively present in this process module and is to be processed by this process module is less than or greater than the limit value for the amount, the mass inflow at the same time being a mass outflow of a further process module connected directly upstream of this process module for production purposes, or a mass outflow from the respective process module is increased or decreased if the amount of material that is respectively present in this process module and is to be processed by this process module is greater than or less than the limit value for the amount, the mass outflow at the same time being a mass inflow of a further process module connected directly downstream of this process module for production purposes. Within the scope of the invention, the terms "limit value for the amount" and "setpoint value for the amount" may be used synonymously.

If a mass inflow into the respective process module is increased when the amount of material that is respectively present in this process module and is to be processed by this process module is less than the limit value for the amount, the mass inflow at the same time being a mass outflow of a further process module connected directly upstream of this process module for production purposes, the production plant or the process modules thereof operate(s) on the basis of a regulating concept known from production engineering, known as the pulling principle. If, on the other hand, a mass outflow from the respective process module is increased when the amount of material that is respectively present in this process module and is to be processed by this process module is greater than the limit value for the amount, the mass outflow at the same time being a mass inflow of a further process module connected directly downstream of this process module for production purposes, the production plant or the process modules thereof operate(s) on the basis of a regulating concept that is likewise known from production engineering, known as the pushing principle. Consequently, in the case of the pulling principle, the impulse for activity originates from a process module respectively connected downstream of a process module, whereas, in the case of the pushing principle, the impulse for activity originates from a process module respectively connected upstream of a process module. It is essential to the invention that all of the process modules of a production plant operate uniformly on the basis of the pulling principle or the pushing principle. If not all of the process modules of a production plant were to operate uniformly on the basis of the pulling principle or the pushing principle, these process modules would work against one another. It is also not advisable to regulate an outflow of an upstream process module independently of an inflow of a process module connected downstream of the upstream process module.

The process modules which can be connected to one another for production purposes and are autonomous for regulating purposes may be designed as units which can be transported as a whole, can be transported to a desired production site at which a correspondingly equipped production plant of a modular construction is intended to be erected, and can be transported away from this site after the desired production has been concluded. This makes it possible to easily reuse individual process modules at different production sites in a manner that reduces production costs. For this purpose, a process module may have a housing which allows easy transport of the process module and in which at least one process assembly for carrying out the desired process section is arranged and the dimensioning thereof can be standardized.

At a production site, the process modules can be connected, preferably via standardized couplings, to a permanently installed communication network and to a supply network which can be used to supply the process modules with material and/or energy and/or into which materials can be delivered, with the result that at least one chemical batch reaction and/or continuous production can be carried out in a substantially autonomous manner using the process modules. The supply network can be used to transport, in particular, solid, liquid and/or gaseous materials or mixtures of materials which may be present in single-phase or multiphase form, for example as a suspension or emulsion. For example, the supply network may have a compressed air line for supplying compressed air, a feed water line for supplying water, an electrical line for supplying electrical energy, a materials line for supplying starting materials and/or auxiliary materials and/or for discharging products, by-products and/or waste materials, a cooling line for supplying cold or for dissipating heat and/or a heating line for supplying heat or for removing cold. Various wired or wireless communication networks come into consideration as the communication network. Standardized information interchange between the process modules connected to the communication network can be carried out via the communication network.

Additionally or alternatively, a material and/or energy store which can be connected to the supply network and/or a storage container for liquid, solid and/or gaseous materials may be provided inside the housing of a process module, with the result that chemical reactions can take place autonomously and independently of an external supply. The process modules may have, for example, functionalities for heating, cooling, mixing, separating, controlling the pressure, ventilating and/or venting which make it possible to carry out a chemical reaction and control reaction conditions.

According to an advantageous refinement, for detecting the amount of material that is respectively present in at least one of the process modules and is to be processed by this process module, a filling level in this process module is detected. This represents an easy possible way of detecting the amount of material that is respectively present in a process module and is to be processed by the process module by means of suitable filling level sensors. It is also possible to perform in each process module a detection of the amount of material that is present in the process module and is to be processed by this process module by means of detecting the filling level in the process module.

According to a further advantageous refinement, for detecting the amount of material that is respectively present in at least one of the process modules and is to be processed by this process module, a pressure in this process module is detected. This may be provided as an alternative to the last-mentioned refinement, or in addition to it to obtain redundant information. This refinement also represents an easy possible way of detecting the amount of material that is respectively present in a process module and is to be processed by the process module by means of suitable pressure sensors. It is also possible to perform in each process module a detection of the amount of material that is present in the process module and is to be processed by this process module by means of detecting the pressure in the process module.

Patent Claim 4 proposes a production plant for producing a chemical and/or pharmaceutical product, having at least two process modules which can be connected to one another for production purposes and are autonomous for regulating purposes, wherein each process module has an electronic device of its own, in particular a control and/or regulating device, which is set up to detect continuously or discretely an amount of material that is respectively present in the respective process module and is to be processed by this process module and compare it with a prescribed limit value for the amount, wherein each electronic device is also set up to actuate an inflow of the respective process module to increase or decrease a mass inflow into this process module if the amount of material that is respectively present in this process module and is to be processed by this process module is less than or greater than the limit value for the amount, the inflow at the same time being an outflow of a further process module connected directly upstream of this process module for production purposes, or to actuate an outflow of the respective process module to increase or decrease a mass outflow from this process module if the amount of material that is respectively present in this process module and is to be processed by this process module is greater than or less than the limit value for the amount, the outflow at the same time being an inflow of a further process module connected directly downstream of this process module for production purposes.

The advantages and embodiments mentioned above with respect to the method are correspondingly associated with this production plant.

Individual process modules may be changed over from the pulling principle to the pushing principle, or vice versa. It is alternatively possible that individual process modules integrated in a corresponding production plant change over automatically and of their own accord. This may additionally necessitate a redesign of the way in which a process module is otherwise regulated, such as for example the way in which internal buffer networks of a process module are regulated.

Each electronic device of a process module may be able to be connected for communication purposes to the aforementioned communication network. The electronic device preferably detects when the respective process module is connected to the communication network, after which the electronic device automatically feeds an identification signal into the communication network, from which signal the generic type of the process module is clear, for example.

Each electronic device may be set up to control and/or regulate the respective process module to independently carry out a particular process section of production. In this case, independently means that the process section is carried out using the process module without the process section or a part of the latter having to be controlled and/or regulated for this purpose by a device remote from the process module. The process module can accordingly thus operate autonomously.

The electronic devices may also be set up in such a manner that process modules connected to the communication network for communication purposes can automatically communicate with one another, for example in such a manner that at least one process module automatically requests information from at least one further process module. This automatic communication between the process modules is possible, in particular, if process modules which are connected to the communication network use their respective electronic device to output an identification signal to the communication network, which signal is received by process modules which are already connected to the communication network. As a result, the receiving process modules can be informed of the address of the process module newly connected to the communication network. In the case of the process modules which are already connected to the communication network or their electronic devices for example, this may be a trigger for these process modules to also emit a corresponding identification signal to the communication network, which signal is in turn received by the process module newly connected to the communication network. The production plant may in this respect have a plug and play functionality.

The information which can be requested from the further process modules may comprise information in the form of given and/or expected process parameters with regard to the process section carried out or to be carried out by the process module providing this information. These process parameters can then be used to control and/or regulate a requesting process module. This is advantageous, in particular, for a subsequent process module which is intended to further process an intermediate product produced by a preceding process module in a temporally preceding process section. For this further processing by the subsequent process module, it is considerably important to know what properties the intermediate product produced by the preceding process module has in order to be able to determine which boundary conditions for producing the desired end product from the intermediate product exist and must be complied with by the subsequent process module.

According to an advantageous refinement, at least one process module has at least one filling level sensor detecting the filling level of the material in this process module and connected for communication purposes to the electronic device of this process module, the electronic device being set up to determine from the filling level of material respectively detected by means of the filling level sensor the amount of material that is respectively present in the process module and is to be processed by the process module. The advantages and embodiments mentioned with respect to the corresponding refinement of the method are correspondingly associated with this.

According to a further advantageous refinement, at least one process module has at least one pressure sensor detecting the pressure in this process module and connected for communication purposes to the electronic device of this process module, the electronic device being set up to determine from the pressure respectively detected by means of the pressure sensor the amount of material that is respectively present in the process module and is to be processed by the process module. The advantages and embodiments mentioned with respect to the corresponding refinement of the method are also correspondingly associated with this.

A further advantageous refinement provides that on each line forming an outflow for an upstream process module and at the same time an inflow for a process module connected downstream of this process module there is arranged at least one electrically activatable valve connected for communication purposes to the electronic device of the upstream process module or of the downstream process module. This allows a material outflow or a material inflow out of or into a process module to be regulated in an easy way.

The invention is explained below by way of example with reference to the accompanying figures with the aid of preferred exemplary embodiments and the features specified below may constitute an aspect of the invention either on their own or in combination with one another. In the figures

DETAILED DESCRIPTION OF THE DISCLOSURE

Figure 1:
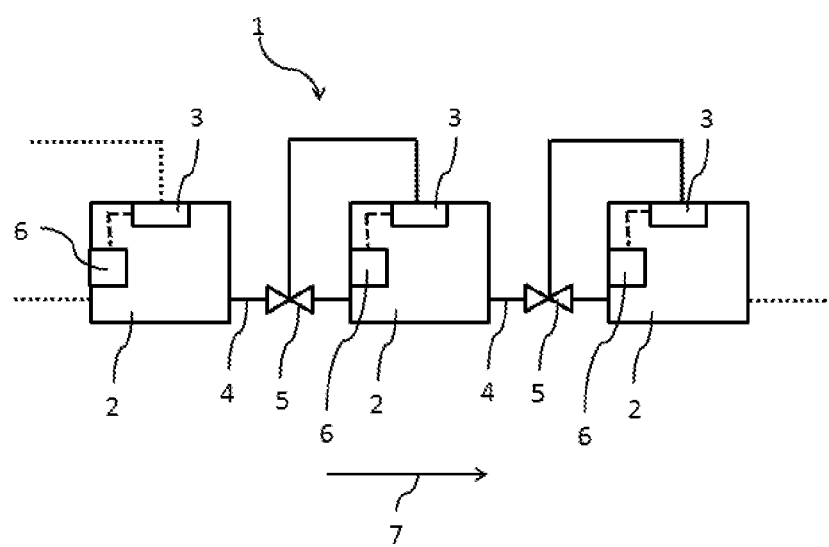
FIG. 1 shows a schematic illustration of an exemplary embodiment of a production plant according to the invention and FIG. 2 shows a schematic illustration of a further exemplary embodiment of a production plant according to the invention.

In FIG. 1 is an exemplary embodiment of a production plant 1 according to the invention for producing a chemical and/or pharmaceutical product. The material flow is indicated by the arrow 7. The production plant 1 comprises n process modules 2 which are connected to one another for production purposes and are autonomous for regulating purposes. Each process module 2 has an electronic device 3, in particular a control and/or regulating device, which is set up to detect continuously or discretely an amount of material that is respectively present in the respective process module 2 and is to be processed by this process module 2 and compare it with a prescribed limit value for the amount. Each electronic device 3 is also set up to actuate an inflow of the respective process module 2 to increase a mass inflow into this process module 2 if the amount of material that is respectively present in this process module 2 and is to be processed by this process module 2 is less than the limit value for the amount, the inflow at the same time being an outflow of a further process module 2 connected directly upstream of this process module 2 for production purposes. The production plant 1 or the process modules 3 thereof consequently operate on the pulling principle. To be able to increase the respective inflow correspondingly, on each line 4 forming an outflow for an upstream process module 2 and at the same time an inflow for a process module 2 connected downstream of this process module 2 there is arranged an electrically activatable valve 5 connected for communication purposes to the electronic device 3 of the downstream process module 2.

Each process module 2 also comprises a filling level sensor 6 detecting the filling level of the material in this process module 2 and connected for communication purposes to the electronic device 3 of this process module 2, the electronic device 3 being set up to determine from the filling level of material respectively detected by means of the filling level sensor 6 the amount of material that is respectively present in the process module 2 and is to be processed by the process module 2. Alternatively or in addition, each process module 2 may have a pressure sensor (not represented) detecting the pressure in this process module 2 and connected for communication purposes to the electronic device 3 of this process module 2, the electronic device 3 being set up to determine from the pressure respectively detected by means of the pressure sensor the amount of material that is respectively present in the process module 2 and is to be processed by the process module 2. For this purpose, each electronic device 3 may have a microprocessor and a suitable storage medium.

Figure 2:
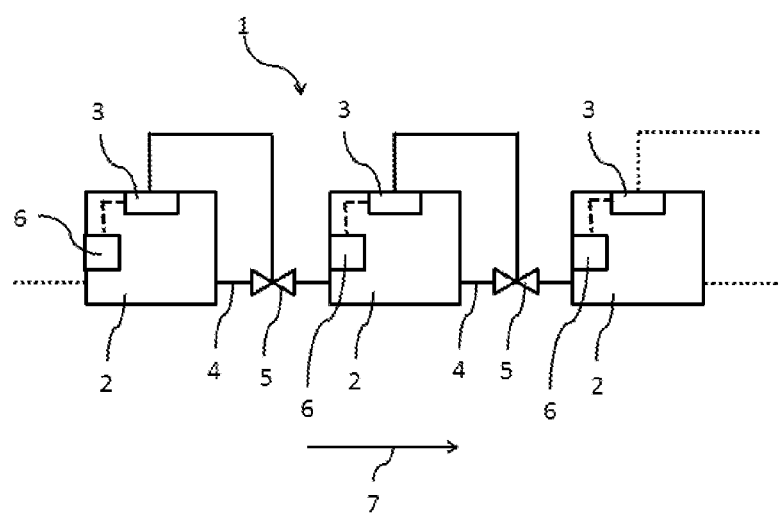

FIG. 2 shows a schematic illustration of a further exemplary embodiment of a production plant 1 according to the invention. This production plant 1 differs from the exemplary embodiment shown in FIG. 1 in particular in that each electronic device 3 is set up to actuate an outflow of the respective process module 2 to increase the mass outflow from this process module 2 when the amount of material that is respectively present in this process module 2 and is to be processed by this process module 2 is greater than the limit value for the amount, the outflow at the same time being an inflow of a further process module 2 connected directly downstream of this process module 2 for production purposes. On each line 4 forming an outflow for an upstream process module 2 and at the same time an inflow for a process module 2 connected downstream of this process module 2 there is arranged an electrically activatable valve 5 connected for communication purposes to the electronic device 3 of the upstream process module 2.

The invention claimed is:

1. A method for operating a production plant for producing a chemical and/or pharmaceutical product, the production plant including a plurality of transportable process modules (P1 . . . Pn) wherein each of the plurality of process modules (P1 . . . Pn) are reversibly connected to one another for production purposes and are autonomous for regulating purposes and include an associated electronic device (E1 . . . En) and a material quantity sensor communicatively connected to the respective electronic device (E1 . . . En), the method comprising:
    detecting the quantity of material to be processed in each of said plurality of process modules (P1 . . . Pn);
    comparing the quantity of material with a proscribed limit for the quantity; and,
    initiating a mass flow of material from an upstream process module (P1 . . . Pn) to the respective downstream process module (P1 . . . Pn) based on the comparison of the quantity of material with the proscribed limit;
    wherein the respective electronic device (E1 . . . En) is communicatively connected to an electrically activated flow valve located between said upstream process module and said downstream process module and directs the electrically activated flow valve to open.

2. The method of claim 1 wherein the material quantity sensor is a fill level sensor.

3. The method of claim 1 wherein the material quantity sensor is a pressure sensor.

4. The method of claim 1 wherein the respective electronic device (E1 . . . En) is communicatively connected to the electrically activated flow valve downstream from its associated process module (P1 . . . Pn).

5. The method of claim 1 wherein the respective electronic device (E1 . . . En) is communicatively connected to the electrically activated flow valve upstream from its associated process module (P1 . . . Pn).

6. A production plant for producing a chemical and/or pharmaceutical product, the production plant comprising:
    at least two transportable process modules (P1 . . . Pn),
    at least one reversible connection between each of the at least two process modules (P1 . . . Pn),
    wherein each said at least two process modules (P1 . . . Pn) includes at least one respective electronic device (E1 . . . En),
    wherein each said at least two process modules (P1 . . . Pn) further includes at least one material quantity sensor detecting the filling level of the material in the respective at least two process module (P1 . . . Pn) and connected for communication purposes to the at least one electronic device (E1 . . . En) of the respective at least two process modules (P1 . . . Pn), and,
    at least one electronically activated flow valve positioned between each of the at least two process modules (P1 . . . Pn),
    wherein each said electronic device (E1 . . . En) is a control and/or regulating device configured to detect an amount of material that is respectively present in one or more of the respective at least two process modules (P1 . . . Pn) and to be processed by the one or more modules (P1 . . . Pn) to compare the amount of material with a prescribed limit value for the amount of material and,
    wherein each electronic device (E1 . . . En) is additionally configured to actuate the at least one electronically activated control valve to initiate a flow of the material into or out of the respective at least two process modules (P1 . . . Pn) to increase or decrease a mass flow between the respective at least two process modules (P1 . . . Pn) and an adjacent process module (P1 . . . Pn) of the at least two process modules (P1 . . . Pn)
    wherein if the amount of material that is respectively present in the respective process module (P1 . . . Pn) and is to be processed by the respective process module (P1 . . . Pn) is less than the limit value for the amount as detected by the fill sensor, an inflow into the respective process module (P1 . . . Pn) is at the same time an outflow of a further at least two process module (P1 . . . Pn) connected directly upstream of the respective process module (P1 . . . Pn) for production purposes, and,
    wherein if the amount of material that is respectively present in the respective process module (P1 . . . Pn) and is to be processed by the respective process module (P1 . . . Pn) is greater than the limit value for the amount as detected by the fill sensor, to actuate an outflow out of the respective at least two process module (P1 . . . Pn) the outflow at the same time being an inflow of a further process module (P1 . . . Pn) connected directly downstream of this process module for production purposes.

7. The production plant according to claim 6, wherein the at least one material quantity sensor is a filling level sensor configured to detect the filling level of the material in the respective at least two process module (P1 . . . Pn), wherein the electronic device (E1 . . . En) is configured to determine from the detected filling level of material the amount of material that is respectively present in the respective process module (P1 . . . Pn) and is to be processed by the respective process module (P1 . . . Pn).

8. The production plant according to claim 6, wherein at least one material quantity sensor is a pressure sensor configured to detect the pressure in the respective at least two process module (P1 . . . Pn) wherein the electronic device (E1 . . . En) is configured to determine from the pressure the amount of material present in the respective process module (P1 . . . Pn) and is to be processed by the respective process module (P1 . . . Pn).

9. The production plant of claim 6 wherein the material quantity sensor detects the amount of material present in the respective at least two process modules (P1 . . . Pn) continuously.

10. The production plant of claim 6 wherein the material quantity sensor detects the amount of material present in the respective at least two process modules (P1 . . . Pn) discretely.

11. The production plant according to claim 6 wherein the at least one electrically activated valve is connected to the electronic device of the upstream process module (P1 . . . Pn−1).

12. The production plant according to claim 6 wherein at least one electrically activated valve is connected to the electronic device of the downstream process module (P2 . . . Pn).

13. The production plant according to claim 6 further comprising a permanently installed communication network wherein at least one of the at least two process modules (P1 . . . Pn) is reversibly connected to the permanently installed communication network.

14. The production plant according to claim 6 further comprising a supply network wherein at least one of the at least two process modules (P1 . . . Pn) is reversibly connected to the supply network.

* * * * *